United States Patent [19]

Welsh

[11] Patent Number: 4,880,574

[45] Date of Patent: Nov. 14, 1989

[54] METHOD FOR REFINING GLYCERIDE OILS USING PARTIALLY DRIED AMORPHOUS SILICA HYDROGELS

[75] Inventor: William A. Welsh, Fulton, Md.

[73] Assignee: W. R. Grace & Co.-Conn., New York, N.Y.

[21] Appl. No.: 934,058

[22] Filed: Nov. 24, 1986

Related U.S. Application Data

[63] Continuation-in-part of Ser. No. 679,348, Dec. 7, 1984, Pat. No. 4,629,588, and a continuation-in-part of Ser. No. 823,217, Jan. 28, 1986, Pat. No. 4,734,226.

[51] Int. Cl.⁴ ............ C09F 5/10

[52] U.S. Cl. ............ 260/428; 260/410.7; 260/420; 260/424; 423/339

[58] Field of Search ............ 260/420, 424, 428, 410.7; 423/339

[56] References Cited

U.S. PATENT DOCUMENTS

| | | | |
|---|---|---|---|
| 3,284,213 | 11/1966 | Van Akkeren | 426/329 |
| 3,955,004 | 5/1976 | Strauss | 426/254 |
| 4,049,686 | 9/1977 | Ringers et al. | 260/424 |
| 4,298,622 | 11/1981 | Singh et al. | 426/254 |
| 4,330,564 | 5/1982 | Friedman | 426/417 |
| 4,623,489 | 11/1986 | Rivers | 260/428 |
| 4,629,588 | 12/1986 | Welsh et al. | 260/428 |
| 4,734,226 | 3/1988 | Parker et al. | 260/428 |
| 4,764,384 | 8/1988 | Gyann | 260/428 |

FOREIGN PATENT DOCUMENTS

| | | |
|---|---|---|
| 0108571 | 5/1984 | European Pat. Off. . |
| 228889 | 3/1926 | United Kingdom . |
| 612169 | 11/1948 | United Kingdom . |
| 865807 | 4/1961 | United Kingdom . |
| 1522149 | 8/1978 | United Kingdom . |
| 1564402 | 4/1980 | United Kingdom . |

OTHER PUBLICATIONS

Mag, T. K.—"Heat Refining of Edible Oils"; (Abstract) 1973—vol./pp. 50/251-254.

Alfa-Laval AB—"Removal of Nonhydratable Phosphatides (NHP) from Vegetable Oils"; (Abstract) 1981—vol./pp. 203/110-111.

Vinyokova, N. P.—"Hydration of Vegetable Oils by Solutions of Polarizing Compounds"; (Abstract) 1984—vol./pp. 17-9/12-15.

Arutyunyan et al.—"Purification of Light Veg. Oils"; (Abstract) 1984.

Handel et al.—"Behavior of Phospholipids in Soybean Oil on Silica Acid"; 1984—vol./pp. 49/1399-1400.

Brown et al.—"Adsorption of Soy Oil Phospholipids on Silics"; 1985—vol./pp. 62/753-757.

Gutfinger—"Pretreatment of Soybean Oil for Physical Refining: Evaluation of Efficiency of Various Adsorbents in Removing Phospholipids and Pigments"; 1978—vol./pp. 55/856-859.

*Primary Examiner*—Bruce Gray

*Attorney, Agent, or Firm*—Jill H. Krafte

[57] ABSTRACT

Adsorbents comprising partially dried amorphous silica hydrogels having a moisture content of at least about 25 wt % and an average pore diameter of about 60 Angstroms or less are useful in processes for the removal of trace contaminants, specifically phospholipids and associated metal ions, from glyceride oils. Treatment of the partially dried hydrogels with organic acid increases their adsorption capacity for these trace contaminants.

14 Claims, No Drawings

METHOD FOR REFINING GLYCERIDE OILS USING PARTIALLY DRIED AMORPHOUS SILICA HYDROGELS

This application is a continuation-in-part of co-pending U.S. Ser. No. 679,348, for "Method for Refining Glyceride Oils Using Amorphous Silica" (Welsh et al.), filed Dec. 7, 1984 (now U.S. Pat. No. 4,629,588) and co-pending U.S. Ser. No. 823,217, for "Method of Refining Glyceride Oils Using Acid Treated Amorphous Silica" (Welsh et al.) filed Jan. 28, 1986 now U.S. Pat. No. 4,734,226).

BACKGROUND OF THE INVENTION

This invention relates to a method for refining glyceride oils by contacting the oils with an adsorbent capable of selectively removing trace contaminants. More specifically, it has been found that partially dried amorphous silica hydrogels of suitable porosity are quite effective in adsorbing phospholipids and associated metal ion containing species from glyceride oils, to produce oil products with substantially lowered concentrations of these trace contaminants. The term "glyceride oils" as used herein is intended to encompass both vegetable and animal oils. The term is primarily intended to describe the so-called edible oils, i.e., oils derived from fruits or seeds of plants and used chiefly in foodstuffs, but it is understood that oils whose end use is as non-edibles are to be included as well. It is expected that the primary commercial utility of this invention will be in the oil refining process, but the method may be used with any glyceride oil from which it is desirable to remove trace contaminants.

Crude glyceride oils, particularly vegetable oils, are refined by a multi-stage process, the first step of which is degumming by treatment with water or with a chemical such as phosphoric acid, citric acid or acetic anhydride. Gums may be separated from the oil at this point or carried into subsequent phases of refining. A broad range of chemicals and operating conditions have been used to perform hydration of gums for subsequent separation. For example, Vinyukova et al., "Hydration of Vegetable Oils by Solutions of Polarizing Compounds," Food and Feed Chem., Vol. 17-9, pp. 12–15 (1984), discloses using a hydration agent containing citric acid, sodium chloride and sodium hydroxide in water to increase the removal of phospholipids from sunflower and soybean oils. U.S. Pat. No. 4,049,686 (Ringers et al.) discloses dispersing a substantially concentrated acid or anhydride in the oil, adding water and separating the aqueous phase containing gums and phospholipids. It is disclosed that acetic acid, citric acid, tartaric acid, lactic acid, etc. are most preferred. In addition to the use of organic acids during oil degumming, citric acid and other weak acids have been used as trace metal deactivating agents to promote taste and oxidative stability of edible oils.

After degumming, the oil may be refined by a chemical process including neutralization, bleaching and deodorizing steps. Alternatively, a physical process may be used, including a pretreating and bleaching step and a steam refining and deodorizing step. Physical refining processes do not include a caustic refining step. State-of-the-art processes for both physical and chemical refining are described by Tandy et al. in "Physical Refining of Edible Oil," J. Am. Oil Chem. Soc., Vol. 61, pp. 1253–58 (July 1984). One object of either refining process is to reduce the levels of phospholipids, which can lend off colors, odors and flavors to the finished oil product. In addition, ionic forms of the metals calcium, magnesium, iron and copper are thought to be chemically associated with phospholipids and to negatively effect the quality of the final oil product.

The removal of phospholipids from edible oils has been the object of a number of previously proposed physical process steps in addition to the conventional chemical processes. For example, Gutfinger et al., "Pretreatment of Soybean Oil for Physical Refining: Evaluation of Efficiency of Various Adsorbents in Removing Phospholipids and Pigments," J. Amer. Oil. Chem. Soc., Vol. 55, pp. 865–59 (1978), describes a study of several adsorbents, including Tonsil L80 (TM) and Tonsil ACC (TM) (Sud Chemie, A. G.), Fuller's earth, Celite (TM) (Johns-Manville Products Corp.), Kaoline (sic), silicic acid and Florosil (sic) (TM) (Floridin Co.), for removing phospholipids and color bodies from phosphoric acid degummed soybean oil. U.S. Pat. No. 3,284,213 (Van Akkeren) discloses a process using acid bleaching clay for removing phosphoric acid material from cooking oil. U.S. Pat. No. 3,955,004 (Strauss) discloses improvement of the storage properties of edible oils by contacting the oil, in solution in a non-polar solvent, with an adsorbent such as silica gel or alumina and subsequently bleaching with a bleaching earth. U.S. Pat. No. 4,298,622 (Singh et al.) discloses bleaching degummed wheat germ oil by treating it with up to 10% by weight of an adsorbent such as Filtrol (TM) (Filtrol Corp.), Tonsil (TM), silica gel, activated charcoal or fuller's earth, at 90°–110° C. under strong vacuum.

It previously has been taught, U.S. Ser. No. 679,348, filed Dec. 7, 1984 (now U.S. Pat. No. 4,629,588) (Welsh et al., "Method for Refining Glyceride Oils Using Amorphous Silica"), that amorphous silica with an effective average pore diameter of greater than 60A is useful for removing phospholipids and trace contaminants from glyceride oils. Welsh et al. also teaches that the described amorphous silicas which have a water content of greater than 30 wt% are preferred. Hydrogels are taught in that specification to be the preferred adsorbent.

It is taught in U.S. Ser. No. 823,217, filed Jan. 28, 1986 (now U.S. Pat. No. 4,734,226) (Welsh et al. "Method of Refining Glyceride Oils Using Acid Treated Amorphous Silica"), that the treatment of certain amorphous silica adsorbents with organic acid improves the adsorbents' capacity for phospholipids and metal ions.

SUMMARY OF THE INVENTION

Trace contaminants, such as phospholipids and associated metal ions, can be removed effectively from glyceride oils by adsorption onto amorphous silica. The process described herein utilizes partially dried amorphous silica hydrogels having a moisture content of at least about 25 weight percent and an average pore diameter of less than about 60 Angstroms. Treatment of these silica adsorbents with organic acid, such as citric, acetic, ascorbic or tartaric acids, or solutions thereof, in such a manner that at least a portion of the organic acid is retained in the pores of the silica, has been found to enhance adsorptive capacity for these trace contaminants.

It is an object of this invention to provide an adsorbent which is useful for reducing the phospholipid and trace contaminant content of glyceride oils to acceptable levels. Adsorption of phospholipids and associated contaminants onto partially dried amorphous silica hydrogels in the manner described can eliminate any need to use caustic refining, thus dispensing with one unit operation, as well as the need for wastewater treatment from that operation. Over and above the cost savings realized from simplification of the oil processing, the overall value of the product is increased since a significant by-product of caustic refining is aqueous soapstock, which is of very low value. Alternatively, the partially dried hydrogels of this invention may be used in conjunction with caustic refining processes. As yet another alternative, these adsorbents may be employed to treat used cooking oil to remove phospholipids which frequently contaminate the oil as a result of frying certain types of foods.

It is also intended that use of the method of this invention may reduce or potentially eliminate the need for bleaching earth steps. Reduction or elimination of the bleaching earth step will result in substantial oil conservation as this step typically results in significant oil loss. Moreover, since spent bleaching earth has a tendency to undergo spontaneous combustion, reduction or eliminatino of this step will yield an occupationally and environmentally safer process.

It is an additional object to provide appreciable cost savings by the use of acid-treated partially dried amorphous silica hydrogels, which allows for significantly reduced adsorbent loadings and organic acid usage. The use of the organic acid-treated silica adsorbent is substantially more economical than separate treatments with acid and with adsorbent. Moreover, separate storage of citric or other acid is eliminated, as is the separate process step for the addition of the acid. Separate acid treatment also requires centrifugal separation of the acid from oil, or else the use of large quantities of solids such as bleaching earth to absorb the separated phase. By contrast, the method of this invention utilizes an efficient method for bringing the oil and acid together, followed by a simple physical separation of the solid adsorbent from the liquid oil.

Another object of this invention is to provide an adsorbent which is both suitable for reduction of trace contaminants and relatively easy to handle. The partially dried hydrogel adsorbents described herein are in the form of a "dry" free-flow powder which can be easily shipped, stored and used.

DETAILED DESCRIPTION OF THE INVENTION

It has been found that certain amorphous silicas are particularly well suited for removing trace contaminants, specifically phospholipids and associated metal ions, from glyceride oils. The process for the removal of these trace contaminants, as described in detail herein, essentially comprises the steps of selecting a glyceride oil with a phosphorus content in excess of about 1.0 ppm, selecting an adsorbent comprising a suitable partially dried amorphous silica hydrogel, contacting the glyceride oil and the adsorbent, allowing the phospholipids and associated metal ions to be adsorbed, and separating the resulting phospholipid- and metal ion-depleted oil from the adsorbent.

Suitable partially dried amorphous silica hydrogels for this process are those with a moisture content of at least about 25 weight percent and an average pore diameter of about 60 A or less. Particularly suitable are organic acid-treated silicas of this description and it has been found that partially dried hydrogels lend themselves especially well to the acid pre-treatment process. The amorphous silica is pre-treated with an organic acid such as citric, acetic, tartaric or ascorbic acid in such a manner that at least a portion of the organic acid is retained in pores of the silica. It is preferred that the total volatiles content of the acid-treated amorphous silica be at least about 25 wt%. In this description, where partially dried amorphous silica hydrogels are mentioned, the reference is intended to also include the acid-treated counterparts of these adsorbents, unless stated otherwise.

The process described herein can be used for the removal of phospholipids from any glyceride oil, for example, oils of soybean, peanut, rapeseed, corn, sunflower, palm, coconut, olive, cottonseed, etc. Removal of phospholipids from these edible oils is a significant step in the oil refining process because residual phosphorus can cause off colors, odors and flavors in the finished oil. Typcially, the acceptable concentration of phosphorus in the finished oil product should be less than about 15.0 ppm, preferably less than about 5.0 ppm, according to general industry practice. As an illustration of the refining goals with respect to trace contaminants, typical phosphorus levels in soybean oil at various stages of chemical refining are shown in Table I. Phosphorus levels at corresponding stages in physical refining processes will be comparable. Where previously used oils are being re-purified by this method, it is expected that the target values for phosphorus and associated metal ions will be approximately in the range designated End Product in Table I.

TABLE I[1]

| | Trace Contaminant Levels (ppm) | | | | |
|---|---|---|---|---|---|
| Stage | P | Ca | Mg | Fe | Cu |
| Crude Oil | 450–750 | 1–5 | 1–5 | 1–3 | 0.03–0.05 |
| Degummed Oil | 60–200 | 1–5 | 1–5 | 0.4–0.5 | 0.02–0.04 |
| Caustic Refined Oil | 10–15 | 1 | 1 | 0.3 | 0.003 |
| End Product | 1–15 | 1 | 1 | 0.1–0.3 | 0.003 |

[1]Data assembled from the Handbook of Soy Oil Processing and Utilization, Table I, p. 14 (1980), and from FIG. 1 from Christenson, Short Course: Processing and Quality Control of Fats and Oils, presented at American Oil Chemists' Society, Lake Geneva, WI (May 5–7, 1983).

In addition to phospholipid removal, the adsorbent and process of this invention also remove from edible oils ionic forms of the metals calcium, magnesium, iron and copper, which are believed to be chemically associated with phospholipids. These metal ions themselves have a deleterious effect on the refined oil products. Calcium and magnesium ions can result in the formation of precipitates. The presence of iron and copper ions promote oxidative instability. Moreover, each of these metal ions is associated with catalyst poisoning where the refined oil is catalytically hydrogenated. Typical concentrations of these metals in soybean oil at various stages of chemical refining are shown in Table I. Metal ion levels at corresponding stages of physical refining processes will be comparable. Throughout the description of this invention, unless otherwise indicated, reference to the removal of phospholipids is meant to encompass the removal of associated trace contaminants as well.

Silica gels are prepared by first destabilizing aqueous silicate solutions by acid neutralization. This forms a hard, wet hydrogel which contains substantial quantities of salts as a result of the neutralization reaction (for example, sodium phosphate if the silicate is sodium silicate and the acid is sulfuric acid). This salt-containing hydrogel typically is washed to remove the soluble salts. After washing, the moisture content of the hydrogel is about 60 to 70 wt% or higher, as measured after ignition at 1750° F. The washed hydrogel may be milled to the desired particle size. Hydrogels with a moisture content of greater than about 70 wt% are difficult to mill and may be dried first. Acid treatment of the amorphous silica adsorbent selected for use in this invention may be conducted as a step in the silica manufacturing process or at a subsequent time. The acid treatment process is described below.

The silica adsorbent of this invention must have sufficient porosity to permit access to the phospholipid molecules, while being capable of maintaining good structural integrity upon contact with an aqueous media. The requirement of structural integrity is particularly important where the silica adsorbents are used in continuous flow systems, which are susceptible to disruption and plugging. The partially dried amorphous silica hydrogels used in this process typically have average pore diameters of about 30 to about 60 A. It is assumed that the moisture and salt contents of the hydrogel occupy space and are therefore related to the actual pore volume of the silica hydrogel network. For this reason, the moisture and salt content must be considered when measuring and designating the pore volume of the amorphous silica adsorbents of this invention.

The prepared hydrogel may be dried to varying degrees, which will affect the structure of the silica. Incomplete drying, to a moisture or total volatiles content of at least about 25 wt%, will yield the partially dried hydrogels of this invention. Drying of the hydrogel appears to affect phospholipid adsorption capacity when calculated on a silica (dry) basis. However, when calculated on an as is basis (that is, including whatever moisture may be present in the pore structure), there is no appreciable loss of adsorption capacity. As seen, for example, in Table IV, the capacity may actually increase somewhat and then remain approximately constant as the total volatiles content decreases. The adsorption capacity of the partially dried hydrogels described herein is sufficient to produce glyceride oils with acceptable phospholipid levels. Partially drying the hydrogel as described has the additional advantage of producing an adsorbent which is free-flowing and therefore easy to handle in the plant setting.

It should be appreciated that the hydrogel and undergoes structural changes as a result of the progressive drying described above. As the moisture is removed, the silica adsorbent shrinks somewhat, and some proportion of its pores will collapse, altering the porosity. Drying beyond the point at which the pore volume calculated from weight percent total volatiles is less than that measured by the B-E-T method on the thoroughly dried parent hydrogel, will result nominally in a xerogel, from which water may be further removed but in which the silica structure no longer shrinks. For the purposes of this disclosure, a partially dried hydrogel is any hydrogel partially dried to not less than about 25 wt% total volatiles, regardless of whether the point of nominal xerogel formation has been passed.

With the assumption that the adsorbent comprises cylindrical, monomodal pores, an average pore diameter (APD) in Angstroms may be calculated as:

$$APD = \frac{40{,}000 \times PV}{SA} \qquad (1)$$

where PV is measured pore volume and SA is measured surface area. For determining pore volume of the partially dried hydrogels of this invention, a procedure is used which assumes a direct relationship between pore volume and water content, assuming a low residual salt content. A sample of the hydrogel is weighed into a container and all water is removed from the sample by heating to about 1750° F. to activate. After activation, the sample is re-weighed to determine the weight of the silica on a dry basis, and the pore volume is calculated by the equation:

$$PV(\text{cc/gm}) = \frac{\%TV}{100 - \%TV}, \qquad (2)$$

where TV is total volatiles or moisture content, determined by the wet and dry weight differential. The PV value calculated in this manner is then used in Equation (1).

It is quite possible that the moisture and salts content of a partially dried hydrogel of this invention do not fill all of the available pore network. In addition, the milling process itself may create a secondary pore structure with measurable pore volume. To account for the void space which may be present in these partially dried hydrogels, the mercury pore volume of the adsorbent should be measured on an as is basis (that is, without drying and activating). The mercury pore volume then is added to the total volatiles pore volume. Mercury porosimetry is described in Ritter et al., Ind. Eng. Chem. Anal. Ed. 17,787 (1945). This method, which is useful for measuring pores with diameters about 30 A or above, is based on determining the pressure required to force mercury into the pores of the sample. Alternatively, the nitrogen pore volume of the partially dried hydrogel may be measured by the B-E-T method described below, and that value may be used in Equation (1) to calculate APD. The highest measured pore volume normally will be used in Equation (1) to calculate the APD.

The surface area measurement in the APD equation is measured by the nitrogen Brunauer-Emmett-Teller ("B-E-T") surface area method, described in Brunauer et al., J. Am. Chem. Soc., Vol. 60, p. 309 (1938), which depends on the condensation of nitrogen into the pores of the activated silica. The surface area of all types of appropriately activated amorphous can be measured by this method. Because the nitrogen B-E-T method requires accurate pressure measurements well below atmospheric, substantially all of the water must be removed from the silica hydrogels in an activation step. One method of activation is to evacuate the hydrogel samples at low temperatures (i.e., about room temperature). The objective of this step is to remove the water in the hydrogel under mild temperature conditions, so that the silica surface undergoes minimal alteration due to removal of the bulk of the water. However, subsequent activation at 450° to 700° F. (with vacuum) is typically required to remove water sufficiently to make the B-E-T surface area measurement practical. The measured SA is used in Equation (1) with the measured PV to calculate an average pore diameter (APD). The assumed cylindrical, monomodal pores of this calculation approximate the reality of the non-uniform pores in a silica hydrogel, which has pore size distribution broader than the monomodal assumption. Nonetheless, the APD calculation convention has utility when these limitations are recognized.

For silica hydrogels and partially dried hydrogels, however, the 60 A cutoff for average pore diameter described in U.S. Pat. No. 4,629,588, is an artificial limitation. As stated, the method of calculating pore diameter assumes a monomodal distribution of pore size. Silica hydrogels and partially dried hydrogels may well have actual average pore diameters of at least 60 A, while having lower calculated average pore diameters, perhaps as low as 50 A or less. Deviations from the idealized model will give lower calculated average pore diameters. And, as can be seen in the Examples, calculated pore diameters based on pore volumes measured by different procedures may be significantly different. The measured or calculated average pore diameter for any given adsorbent is, therefore, not a definite and fixed number, but is instead an idealized average which approximates the actual properties of the adsorbent.

Moreover, for partially dried hydrogels, the measured average pore diameter is not necessarily an accurate predicator of phospholipid and trace metal adsorption capacity. Partially dried hydrogels having a total volatiles content of at least about 25 wt% (on ignition at 1750° F.) are effective in this method for phospholipid and metal ion adsorption, notwithstanding the fact that some partially dried hydrogels may have calculated average pore diameters of about 60 A or less. In addition, hydrogels with calculated average pore diameter of about 60 A or below are presumed to be effective in adsorbing phospholipids and associated metal ions, but their preparation currently is beyond the limits of technology.

The adsorption performance of the partially dried silica hydrogels described herein is more noticeably similar to the hydrogels from which they are derived if the adsorption capacities are considered on an as is basis rather than on a dry basis. It is recognized that larger measured average pore diameters are preferred when considering adsorption capacity on a dry basis. However, on an as is basis the partially dried hydrogels of this invention are more nearly equivalent to the parent hydrogels which have a higher average pore diameters. It is consistent with industrial practice to consider the adsorbent on an as is basis, since the selling price of the material typically is calculated in that manner.

It also should be considered that due to drying of the hydrogel some pore volume may be present which is not occupied by water. Such porosity may be measured by mercury porosimetry of the partially dried hydrogel in an as is (not thermally activated) condition. Thus, an average pore diameter calculation based solely on the above-cited convention (Equation (1)) using total volatiles to describe pore volume can be less accurate for partially dried hydrogels than for fully hydrated hydrogels.

The silica hydrogels from which the adsorbents of this invention are derived may be prepared by methods well known to the industry, as described generally above. The partially dried hydrogels themselves are prepared from silica hydrogels by partial drying before, during or after the size reduction step in a typical silica gel manufacturing process. Drying may be accomplished by processes typically used in this art, such as flash or spray drying. Drying may be to a moisture or total volatiles content (on ignition at 1750° F.) of at least about 25 wt%.

Size reduction of the partially dried silica hydrogels is preferred prior to use in the adsorption process of this invention. Reduction to particles of less than about 100 microns is preferred although adsorption will occur with larger particles as well. Desired particle size will depend on the precise application, but particles preferably will be in the range of about 5 to about 75 microns.

The purity of the silica adsorbents used in this invention is not believed to be critical in terms of the adsorption of phospholipids. However, where the finished products are intended to be food grade oils care should be taken to ensure that the silica used does not contain leachable impurities which could compromise the desired purity of the product(s). It is preferred, therefore, to use a substantially pure partially dried amorphous silica hydrogel, although minor amounts, i.e., less than about 10%, of other inorganic constituents may be present. For example, suitable silicas may comprise iron as $Fe_2O_3$, aluminum as $Al_2O_3$, titanium as $TiO_2$, calcium as $CaO$, sodium as $Na_2O$, zirconium as $ZrO_2$, and/or trace elements.

The effectiveness of the partially dried hydrogels of this description in removing trace contaminants from glyceride oils can be dramatically improved by pretreating the silica with an organic acid. It is desired that the silica pores contain either a pure organic acid or an aqueous solution thereof. In the preferred embodiment, the acid will be citric acid or tartaric acid. Alternatively, acetic acid or ascorbic acid may be used. The acids may be used singly or in combination. The treatment may be with neat acid or with an aqueous acid solution diluted to a concentration as low as about 0.05M. The preferred concentration is at least about 0.25M. The total volatiles content of the acid-treated silica should be at least about 25 wt%.

The amorphous silica can be treated with the acidic solution in several ways. The partially dried hydrogels of this invention are particularly well suited for this acid pretreatment, since they will contain some void pore volume which may be filled or partially filled with the acid. First, the silica may be slurried in the acidic solution for long enough for the acid to enter the pores of the silica, typically a period of at least about one half hour, up to about twenty hours. The slurry preferably will be agitated during this period to increase entry of the organic acid into the pore structure of the amorphous silica. The acid-treated silica is then conveniently separated from the solution by filtration and may be dried to the desired total volatiles content.

Alternatively, the acid solution can be introduced to the amorphous silica in a fixed bed configuration, for a similar period of contact. This would be particularly advantageous for treating unsized, washed silica hydrogel, since it would eliminate the standard dewatering-/filtration step in processing the hydrogel. A third method is by introducing a fine spray or jet of the organic acid solution into the amorphous silica as it is fed to a milling/sizing operation. For this method, it will be preferred to use a concentrated acid. The latter two methods will be preferred for treating silica in a commercial scale operation.

The phospholipid adsorption step itself is accomplished by conventional methods in which the partially dried hydrogel and the oil are contacted, preferably in a manner which facilitates the adsorption. The adsorption step may be by any convenient batch or continuous process. In any case, agitation or other mixing will enhance the adsorption efficiency of the silica. The adsorption can be conducted at any convenient temperature at which the oil is a liquid. The glyceride oil and amorphous silica are contacted as described above for a period sufficient to achieve the desired phospholipid content in the treated oil. The specific contact time will vary somewhat with the selected process, i.e., batch or continuous. In addition, the adsorbent usage, that is, the relative quantity of adsorbent brought into contact with the oil, will affect the amount of phospholipids removed. The adsorbent usage is quantified as the weight percent of amorphous silica (on a dry weight basis after ignition at 1750° F.), calculated on the weight of the oil processed.

The preferred adsorbent usage for untreated partially dried hydrogels is about 0.01 to about 1%. The adsorbent usuage for acid-treated partially dried hydrogels may be from about 0.003% to about 1%. As seen in the Examples, significant reduction in phospholipid content of treated oils is achieved by the method of this invention. At a given adsorbent loading, the acid-treated silica of this invention can be expected to significantly outperform untreated silica and will bring about a greater reduction in the phospholipid content of the glyceride oil, notwithstanding that both the treated and untreated forms achieve acceptable reduction of trace contaminant levels. Alternatively, it can be seen that to achieve a desired degree of phospholipid reduction, substantially less silica need be used if it has been acid-treated in the manner of this invention. The specific phosphorous content of the treated oil will depend primarily on the oil itself, as well as on the silica, usage, process, etc. However, phosphorus levels of less than 15 ppm, preferably less than 5.0 ppm, can be achieved using either the untreated or acid-treated partially dried hydrogels of this invention.

Following adsorption, the phospholipid-enriched silica is filtered from the phospholipid-depleted oil by any convenient filtration means. The oil may be subjected to additional finishing processes, such as steam refining, heat bleaching and/or deodorizing. The method described herein may reduce the phosphorus levels sufficiently to eliminate the need for bleaching earth steps. With low phosphorus levels, it may be feasible to use heat bleaching instead. Even where bleaching earth operations are to be employed for decoloring the oil, simultaneous or sequential treatment with amorphous silica and bleaching earth provides an extremely efficient overall process. By using the method of this invention to decrease the phospholipid content, the bleaching earth treatment appears to be more effective. Therefore, either the quantity of bleaching earth required can be significantly reduced, or the bleaching earth will operate more effectively per unit weight. It may be feasible to elute the adsorbed contaminants from the spent silica in order to re-cycle the silica for further oil treatment.

The examples which follow are given for illustrative purposes and are not meant to limit the inveniton described herein. The following abbreviations have been used throughout in describing the invention:

A-Angstroms(s)
APD-average pore diameter
B-E-T-Brunauer-Emmett-Teller
Ca-calcium
cc-cubic centimeter(s)
cm-centimeter
Cu-copper
°C.-degrees Centigrade
°F.-degrees Fahrenheit
Fe-iron
gm-gram(s)
ICP-Inductively Coupled Plasma
m-meter
Mg-magnesium
min-minutes
ml-milliliter(s)
P-phosphorus
ppm-parts per million
%-percent
PV-pore volume
RH-relative humidity
SA-surface area
sec-seconds
TV-total volatiles
wt-weight

EXAMPLE I (Partially Dried Hydrogel Preparation)

The silica adsorbents used in these Examples are listed in Table II, together with their surface properties. Silica Samples 1A, 2A and 3A of Table II were obtained from the Davison Chemical Division of W. R. Grace & Co.-Conn. Samples 1B, 1C and 1D were prepared by partially drying a hydrogel similar to Sample 1A during the milling step in preparing the silica adsorbents. Samples 2A and 3A were subjected to drying by vacuum at room temperature to yield Samples 2B, 2C and 3B-E with progressively lower total volatiles contents and smaller pore volumes. Silica Samples 1B-1D, 2B-2C and 3B-E represent partially dried hydrogels.

Each Sample was analyzed for B-E-T surface area, nitrogen pore volume, mercury pore volume and total volatiles, as indicated in Table II. An Average Pore Diameter was calculated as:

$$APD = \frac{40{,}000 \times PV}{SA}$$

where SA was the measured B-E-T surface are and PV was Pore Volume calculated as:

$$PV = \frac{\%TV}{100 - \%TV}$$

where %TV was the measured total volatiles content. A Total Average Pore Diameter, accounting for both moisture-filled and void space, was calculated as:

$$APD_T = \frac{40{,}000 \times PV_T}{SA}$$

where SA was the measured B-E-T surface area and $PV_T$ was Total Pore Volume calculated as:

$$PV_T = PV + PV_{Hg}$$

where $PV_{Hg}$ was the measured mercury pore volume of the as is adsorbent.

TABLE II

| Silica Sample | SA[1] | % TV[2] | Pore Volume PV[3] | $N_2$[4] | Hg[5] | T[6] | Pore Diameter APD[7] | $APD_T$[8] | $APD_N$[9] |
|---|---|---|---|---|---|---|---|---|---|
| | (Surface Properties of Adsorbents) | | | | | | | | |
| 1A | 940 | 64.0 | 1.78 | 0.95 | 0.14 | 1.92 | 76 | 82 | — |
| 1B | 900 | 58.0 | 1.38 | 0.54 | 0.09 | 1.47 | 61 | 65 | — |
| 1C | 896 | 51.0 | 1.04 | 0.53 | 0.12 | 1.16 | 46 | 52 | — |
| 1D | 883 | 41.0 | 0.69 | 0.52 | 0.07 | 0.76 | 31 | 34 | — |
| 2A | 651 | 60.0 | 1.50 | 1.14 | 0.90 | 2.40 | 90 | 147 | — |
| 2B | 635 | 41.0 | 0.69 | 1.10 | 0.30 | 0.99 | 69 | 62 | — |
| 2C | 635 | 28.0 | 0.39 | 1.09 | 0.59 | 0.98 | 69 | 62 | — |
| 3A | 945 | 63.4 | 1.73 | 0.85 | — | — | 73 | — | — |
| 3B | —[10] | 57.3 | 1.34 | —[10] | — | — | 57 | — | — |
| 3C | —[10] | 42.2 | 0.73 | —[10] | — | — | 31 | — | 36 |
| 3D | —[10] | 35.2 | 0.54 | —[10] | — | — | 23 | — | 36 |
| 3E | —[10] | 26.8 | 0.37 | —[10] | — | — | 16 | — | 36 |

[1]B-E-T surface area measurement.
[2]Weight percent total volatiles on ignition at 1750° F.
[3]PV calculated from % TV as described in this Example.
[4]Nitrogen pore volume measured after drying for 3 hours at 200° C. (392° F.).
[5]Mercury pore volume measured on as is basis.
[6]Total Pore Volume ($PV_T$) calculated by adding PV from Note 3 to $PV_{Hg}$ from Note 5.
[7]Average Pore Diameter calculated as described in this Example using calculated PV (Note 3).
[8]Total Average Pore Diameter calculated as described in this Example using $PV_T$ (Note 6).
[9]Average Pore Diameter calculated using $PV_{N2}$.
[10]SA and $PV_{N2}$ not measured, but assumed to be essentially the same as for Sample 3A.

EXAMPLE II

(Adsorption from Degummed Oil)

A degummed canola oil which contained 66 ppm phosphorus was treated. Adsorbent Samples 1A–D and 2A–C of Example I were added to an oil sample (preheated to 70° C.) at a 0.6 wt% loading on a silica basis. The adsorbent was stirred in the oil for one-half hour at 70° C. then filtered out. The oil was analyzed by inductively coupled plasma (ICP) spectroscopy for phospholipids as ppm phosphorus.

The results are reported in Table III as phosphorus content of the oil after treatment and as weight percent phospholipid capacity, both on a silica basis and on an as is adsorbent basis. Phospholipids conventionally are calculated as 30×ppm phosphorus. The data confirm that the partially dried hydrogels of this invention are useful phospholipid adsorbents. When the adsorption capacity is examined on an as is basis, the performance of the partially dried hydrogels with lower average pore diameters is approximately equivalent to that of hydrogels with higher average pore diameters.

TABLE III (Adsorption from Degummed Canola Oil)

| Silica Sample[1] | ppm P[2] | Wt. % Phospholipid Capacity: Silica Basis[3] | As Is Basis[4] |
|---|---|---|---|
| 1A | 36.2 | 15.1 | 5.4 |
| 1B | 43.7 | 11.3 | 4.7 |
| 1C | 47.7 | 9.3 | 4.6 |
| 1D | 55.6 | 5.4 | 3.2 |
| 2A | 14.8 | 25.6 | 10.2 |
| 2B | 37.7 | 19.2 | 11.3 |
| 2C | 41.3 | 12.4 | 8.9 |

[1]Silica Samples from Example I.
[2]Phosphorus (ppm) measured by ICP spectroscopy

[3]$\text{Capacity Silica} = \frac{\text{Wt. Phospholipids removed}}{\text{Wt. Silica used}} \times 100.$

[4]$\text{Capacity As Is} = \frac{\text{Wt. Phospholipids removed}}{\text{Wt. As Is Adsorbent used}} \times 100.$

EXAMPLE III

(Adsorption from Degummed Oil)

A degummed canola oil which contained 17.9 ppm phosphorus was treated as described in Example II using Silica Samples 3A–E. The results are reported in Table IV as phosphorus content of oil after treatment and as weight percent phospholipid capacity, both on a silica basis and on an as is adsorbent basis. Also reported is a relative capacity on an as is basis, with the capacity of the hydrogel being set at 1.00. When the adsorption capacity is examined on an as is basis, the performance of the partially dried hydrogels is equivalent or superior to that of the hydrogel samples with higher average pore diameters.

TABLE IV (Adsorption from Degummed Canola Oil)

| Silica Sample[1] | ppm P[2] | Wt. % Phospholipid Cap.: Silica Basis[3] | As is Basis[4] | Rel. Cap. As Is[5] |
|---|---|---|---|---|
| 3A | 3.43 | 7.24 | 2.65 | 1.00 |
| 3B | 3.65 | 7.12 | 3.04 | 1.15 |
| 3C | 5.88 | 6.01 | 3.48 | 1.31 |
| 3D | 7.52 | 5.19 | 3.36 | 1.27 |
| 3E | 8.19 | 4.85 | 3.55 | 1.34 |

[1]Silica Samples from Example I.
[2]Phosphorus (ppm) measured by ICP spectroscopy.

[3]$\text{Capacity Silica} = \frac{\text{Wt. Phospholipids removed}}{\text{Wt. Silica used}} \times 100.$

[4]$\text{Capacity As Is} = \frac{\text{Wt. Phospholipids removed}}{\text{Wt. As Is Adsorbent used}} \times 100.$

[5]Relative wt % phospholipid capacity calculated from As Is Basis data.

EXAMPLE IV

(Adsorption from Caustic Refined Oil)

A caustic refined soybean oil containing 4.8 ppm phosphorus and no soaps, and which had not been subjected to bleaching and deodorizing steps, was treated. Each of the adsorbents of Example I was added an oil sample (preheated to 70° C.) at a 0.3 wt% loading on a silica basis. The adsorbent was stirred in the oil for one-half hour at 70° C. then filtered out. The oil was analyzed by ICP spectroscopy for phospholipids as ppm phosphorus.

The results are reported in Table IV as phosphorus content of the oil after treatment and as weight percent capacity on a silica and an as is basis. Again, it is seen that on an as is basis all of the adsorbents had essentially equivalent or superior phospholipid adsorption capacity. All of the adsorbents reduced the phospholipid content of the oil to accetable levels.

TABLE V

| (Adsorption from Caustic Refined Oil) | | | |
|---|---|---|---|
| Silica | | Wt. % Phospholipid Capacity | |
| Sample[1] | ppm P[2] | Silica Basis[3] | As Is Basis[4] |
| 1A | 0 | 4.8 | 1.7 |
| 1B | 0 | 4.8 | 2.0 |
| 1C | 0.3 | 4.5 | 2.2 |
| 1D | 1.8 | 3.0 | 1.8 |

[1]Silica Samples from Example I.
[2]Phosphorus (ppm) measured by ICP spectroscopy.

$$^{3}\text{Capacity Silica} = \frac{\text{Wt. Phospholipids removed}}{\text{Wt. Silica used}} \times 100.$$

$$^{4}\text{Capacity As Is} = \frac{\text{Wt. Phospholipids removed}}{\text{Wt. As Is adsorbent used}} \times 100.$$

The principles, preferred embodiments and modes of operation of the present invention have been described in the foregoing specification. The invention which is intended to be protected herein, however, is not to be construed as limited to the particular forms disclosed, since there are to be regarded as illustrative rather than restrictive. Variations and changes may be made by those skilled in the art without departing from the spirit of the invention.

I claim:

1. A process for the removal of trace contaminants, which are phospholipids and associated metal ions, from glyceride oils by adsorbing said trace contaminants onto amorphous silica, comprising:

(a) selecting a glyceride oil with a phosphorous content in excess of about 1.0 ppm, (b) selecting an adsorbent comprising a partially dried amorphous silica hydrogel having a moisture content of at least about 25 weight percent and an average pore diameter of less than 60 Angstroms, (c) contacting the glyceride oil of step (a) and the adsorbent of step (b), (d) allowing said trace contaminants to be adsorbed onto said adsorbent, and (e) separating the resulting phospholipid- and metal ion-depleted glyceride oil from the adsorbent.

2. The process of claim 1 in which said glyceride oil is soybean oil.

3. The process of claim 1 in which the adsorbent of steb (b) is a partially dried amorphous silica hydrogel having an average pore diameter of between about 20 Angstroms and 60 Angstroms.

4. The process of claim 1 in which said amorphou silica comprises minor amounts of inorganic constitu ents.

5. The process of claim 1 in which the phospholipic depleted oil of step (e) has a phosphorus content of le than about 15.0 parts per million.

6. The process of claim 1 in which the partially drie amorphous silica hydrogel of step (b) has been treate with an organic acid in such a manner that at least portion of said acid is retained in the pores of the silic.

7. The process of claim 6 in which said organic aci is citric, tartaric acid, acetic acid or ascorbic aci or a solution thereof.

8. The process of claim 6 in which said organic aci is neat acid or is an aqueous acid diluted to a concentr tion as low as about 0.05M.

9. An process for the refining of glyceride oil, whic process comprises the steps of degumming, phosph lipid removal, bleaching and deodorizing, the improv ment comprising removing phospholipids by contactin said glyceride oil with a partially dried amorphous silic hydrogel having an average pore diameter of less tha 60 Angstroms and a moisture content of at least 2 weight percent.

10. The process of claim 9 in which said glyceride o is soybean oil.

11. The process of claim 9 in which said partiall dried amorphous silica hydrogel has an average por diameter of between about 20 Angstroms and 60 Ang stroms.

12. The process of claim 9 in which said partiall dried amorphous silica hydrogel has been treated wit an organic acid in such a manner that at least a portio of said organic acid is retained in the pores of the silic.

13. The process of claim 12 in which said organic aci is citric acid, tartaric acid, acetic acid or ascorbic acid

14. A treatment process for decreasing the phosph lipid content of and decolorizing gyceride oils, compris ing treating said glyceride oil by simultaneously o sequentially contacting with a partially dried amo phous silica hydrogel having a moisture content of a least about 25 weight percent and an average pore dian eter of less than 60 Angstroms, and with bleachin earth.

* * * * *